United States Patent [19]

Reed

[11] Patent Number: 4,913,236
[45] Date of Patent: Apr. 3, 1990

[54] METHOD FOR INHIBITING SILICA DISSOLUTION USING PHASE SEPARATION DURING OIL WELL STEAM INJECTION

[75] Inventor: Marion G. Reed, Hacienda Heights, Calif.

[73] Assignee: Chevron Research Company, San Francisco, Calif.

[21] Appl. No.: 307,222

[22] Filed: Feb. 3, 1989

Related U.S. Application Data

[63] Continuation of Ser. No. 164,923, Mar. 7, 1988, abandoned.

[51] Int. Cl.[4] .............................................. E21B 43/24
[52] U.S. Cl. ...................................... 166/303; 166/272; 166/302; 166/902
[58] Field of Search ............... 166/272, 302, 303, 902, 166/57

[56] References Cited

U.S. PATENT DOCUMENTS

| | | | |
|---|---|---|---|
| 3,221,813 | 12/1965 | Closmann et al. | 166/272 X |
| 3,353,593 | 11/1967 | Boberg | 166/272 X |
| 3,384,177 | 5/1968 | Day et al. | 166/307 |
| 3,421,583 | 1/1969 | Koons | 166/272 X |
| 3,442,333 | 5/1969 | Meldau | 166/272 |
| 4,474,011 | 10/1984 | Nelson et al. | 166/272 X |
| 4,549,609 | 10/1985 | Watkins et al. | 166/303 |
| 4,572,296 | 2/1986 | Watkins | 166/902 X |
| 4,662,391 | 5/1987 | Tolley | 166/272 X |
| 4,714,112 | 12/1987 | Nigrini et al. | 166/303 X |

OTHER PUBLICATIONS

Fitzgerald, Ben M., "Surface Insection and Producing Systems for Steam Operations", *Producers Monthly*, Dec. 1967, pp. 18-23.

*Primary Examiner*—George A. Suchfield
*Attorney, Agent, or Firm*—Edward J. Keeling

[57] ABSTRACT

In its broadest aspect, the present invention provides a method for inhibiting silica dissolution in the vicinity of a well penetrating a hydrocarbon-containing formation. It includes: (a) adding an amount of a chmeical compound to a wet steam which forms an alkaline component in the vapor phase of the wet steam effective to inhibit corrosion in the vicinity of the vapor phase condensate; (b) separating the wet steam into the liquid phase and the vapor phase; (c) removing an amount of the liquid phase from the wet steam effective to reduce silica dissolution in the vicinity of the liquid phase; and (d) injecting the wet steam into the formation.

16 Claims, 1 Drawing Sheet

METHOD FOR INHIBITING SILICA DISSOLUTION USING PHASE SEPARATION DURING OIL WELL STEAM INJECTION

This is a continuation of application Ser. No. 164,923, filed March 7, 1988, now abandoned.

BACKGROUND OF THE INVENTION

The present invention relates to a method for inhibiting silica dissolution or silicate formation dissolution. More particularly, the invention relates to a method for (1) preserving the reservoir rock or gravel packing in oil wells being subjected to steam enhanced oil recovery techniques; (2) controlling corrosion produced by an acidic vapor phase condensate of the steam; (3) controlling corrosion produced by an acidic liquid phase of the steam induced by acid overtreatment; (4) preventing permeability damage to a hydrocarbon-containing formation which contains clay minerals; and (5) improving the steam injection late into the formation.

Steam injection techniques, such as steam stimulation and steamflooding, have been used to recover immobile heavy oils and to enhance the oil recovery from older wells where the natural field pressures are too low for unassisted production. They are designed to reduce the reservoir flow resistance by reducing the viscosity of the crude.

These techniques involve injection into the well of a high temperature wet steam in cycles of thousands of cubic meters at a time. Wet steam is a mixture of steam and varying amount of hot liquid water, the quality of wet steam generally ranging from 35% to 80%. Because of the density difference between the two phases of the wet steam, the vapor phase preferentially enters the upper part of the injection interval and the liquid phase preferentially enters the lower part.

When groundwater, river water, or lake water is used as feedwater to generate wet steam, the liquid water phase is generally basic (having a pH in excess of 11) and the vapor phase of the wet steam, when condensed, is acidic (having a pH of about 4.0 to 4.5). This partitioning is because of bicarbonate contained in the source water decomposing to $CO_2$ and $OH^-$, as shown in Equation 1 below:

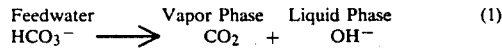

$$\text{Feedwater} \longrightarrow \text{Vapor Phase} \quad \text{Liquid Phase} \quad (1)$$
$$HCO_3^- \longrightarrow CO_2 + OH^-$$

The $CO_2$ is volatile and enters the vapor phase, which produces a low pH in the liquids condensed from the vapor phase. The $OH^-$ ion enters the liquid phase and causes a high pH in the liquid phase.

Associated with using these wet steams in steam injection is the problem of silica dissolution. Coupled with high fluid temperatures, both the liquid phase and the liquids from the condensed vapor phase are capable of rapidly dissolving reservoir rocks, such as sandstone, carbonate, diatomite, procellanite and the like. For pH values above 11.0 and temperatures above 177° C., the silica and silicate dissolution rates are orders of magnitude higher than at neutral/ambient conditions. Also, because the reactions for dissolving siliceous reservoir rocks are base consumers, the liquid pH decreases rapidly as the fluid moves away from the wellbore, causing the dissolution reactions and solubility to diminish rapidly and causing the reaction products downstream (such as alumino-silicates and other metal silicates) to precipitate in the pores. This precipitation decreases the formation permeability and decreases well injectivity.

Dissolution of the gravel pack has been shown to be primarily a function of the pH and temperature of the injected liquid-phase water. Prior attempts at solution of the problem have focused on these aspects. For example, by keeping the pH of the injected hot water below 10, gravel pack dissolution can be decreased sharply. This may be accomplished by (1) selection of feed waters having low total carbonate concentrations (less than 10 mg total carbonate/L), (2) treating the feed water with HCl to yield the desired effluent pH, (3) using a total deionizer to remove both cations and anions from the feed water, or (4) protectively coating the gravel and/or reservoir rocks.

With regard to the first proposed solution, selection of feed waters is often impractical as the large quantities of water used are not available from a choice of sources. The second proposed solution, using HCl to neutralize the bicarbonate alkalinity, was suggested by M. G. Reed in "Gravel Pack and Formation Sandstone Dissolution During Steam Injection", Journal of Petroleum Technology, Vol. 32, pp. 941-949 (1980). But this approach suffers from consideration of cost as well as feasibility of the method. That is, addition of too much acid will cause severe corrosion of the steam generator and too little will result in insufficient depression of the pH to alleviate silica loss. With regard to the third proposed solution, the cost of a total deionizer is prohibitive, both in terms of capital costs as well as daily maintenance costs. With regard to the fourth proposed solution, complete coating of the gravel with a material, such as soybean lecithin described in U.S. Pat. No. 4,323,124, is not assured and driving the material out into the reservoir toward the production well is impractical. Furthermore, this patent does not address the problems of formation dissolution out in the formation away from the well bore.

U.S. Pat. No. 3,438,443 discloses another approach for a solution to the problem through the use of alkali metal silicates to saturate the water phase with silica and thus, hopefully, preventing the dissolution of siliceous formation material. However, alkali metal silicates are costly and the process also requires careful pH control. Moreover, they cause severe formation damage from precipitation of the added silicates.

Still other oil recovery processes as described in U.S. Pat. Nos. 3,500,931; 4,222,439; and 4,223,731 utilize chemicals, such as ammonium hydroxide, ammonium bisulfite, ammonium sulfite in separate injection steps to enhance oil recovery. However, these processes utilize the chemicals in a separate step, generally not including steam, and do not recognize the problems associated with the pH partitioning between the vapor phase of the steam and the residual water phase of the steam during the steps that include steam injection. Still another oil recovery process described in U.S. Pat. No. 4,441,555 utilizes a carbonated water flooding step before a steam drive to enhance the recovery of viscous oil. This process also does not recognize the problems of pH partitioning during steps that require a steam drive.

U.S. Pat. No. 4,475,595 to Watkins et al., filed Aug. 23, 1982, which is hereby incorporated by reference, addresses the problem of silica dissolution during steam injection. Watkins et al. discuss adding an ammonium salt to the generator feedwater or to the steam itself. Ammonia gas partitions to the vapor phase leaving an acidic component to neutralize the OH⁻ ions in the residual liquid phase. But Watkins et al. fail to address the problem of acid overtreatment.

Another problem associated with Equation (1) is its effect on the vapor phase of the steam. The carbon dioxide partitions into the vapor phase while the hydroxyl ions remain in the liquid phase. The vapor phase of the wet steam, when condensed, may have an acidic pH of about 4.0 to 4.5 resulting from the carbon dioxide combining with water to form carbonic acid, a known corrosive. Carbonic acid causes corrosion of steel conduit which it contacts and combines with alkaline earth scale which adheres to the surfaces of the pores in the reservoir, the well bore and other conduits and builds up in thickness over a period of time.

U.S. Pat. No. 4,476,930 to Watanabe, filed Aug. 23,1982, which is hereby incorporated by reference, addresses the problem of scale inhibition during steam generation. Watanabe discusses adding an ammonium salt to the steam generator feedwater. Ammonia gas partitions to the vapor phase and inhibits the production of carbonic acid. Watanabe fails to address the problem of silica dissolution or the problem of acid overtreatment which results in corrosion from a low pH residual liquid phase.

U.S. Pat. No. 4,572,296, to Watkins, filed Sept. 20, 1984, which is hereby incorporated by reference, addresses the problems of silica dissolution and acid overtreatment. Watkins adds an ammonium salt to the feedwater to neutralize hydroxide ions and adds a buffer to prevent acidic pH values produced by overtreatment of the ammonium salt.

While some well-treating methods have met with some success, in particular applications, the need exists for a further improved steam injection treatment which simultaneously (1) inhibits silica dissolution of gravel pack and silicate formations; (2) controls corrosion produced by an acidic vapor phase condensate; and (3) controls corrosion produced by an acidic liquid phase induced by acid overtreatment. Accordingly, it is the principle object of this invention to provide such a method.

A further object of the present invention is to provide a method for preventing permeability damage to a hydrocarbon-containing formation which contains clay minerals.

A further object of the present invention is to provide a method for improving overall steam injectivity into a hydrocarbon-containing formation.

Other objects, advantages, and features of this invention will become apparent to those skilled in the art from the following description of the appended claims.

SUMMARY OF THE INVENTION

The dissolution of silica from the gravel pack in the well bore area and the dissolution of silica and carbonate from the formation is caused by a chemical reaction between water and silica, silicate minerals, and carbonate minerals which is accelerated by heat and either alkalinity or acidity or both, but most of the damage is done by the high alkalinity of the liquid phase. According to the present invention, these dissolutions are inhibited by stripping most of the liquid phase from the steam prior to injection. In that way, the high alkalinity of the liquid phase cannot damage the formation.

In its broadest aspect, the present invention provides a method for inhibiting silica dissolution in the vicinity of a well penetrating a hydrocarbon-containing formation. It includes: (a) adding an amount of a chemical compound to a wet steam which forms an alkaline component in the vapor phase of the wet steam effective to inhibit corrosion in the vicinity of the vapor phase condensate; (b) separating the wet steam into the liquid phase and the vapor phase; (c) removing an amount of the liquid phase from the wet steam effective to reduce silica dissolution in the vicinity of the liquid phase; and (d) injecting the wet steam into the formation.

BRIEF DESCRIPTION OF THE DRAWINGS

In order to facilitate the understanding of this invention, reference will now be made to the appended drawings of preferred embodiments of the present invention. The drawings are exemplary only, and should not be construed as limiting the invention.

DETAILED DESCRIPTION OF THE PREFERRED EMBODIMENTS

Figure 1:
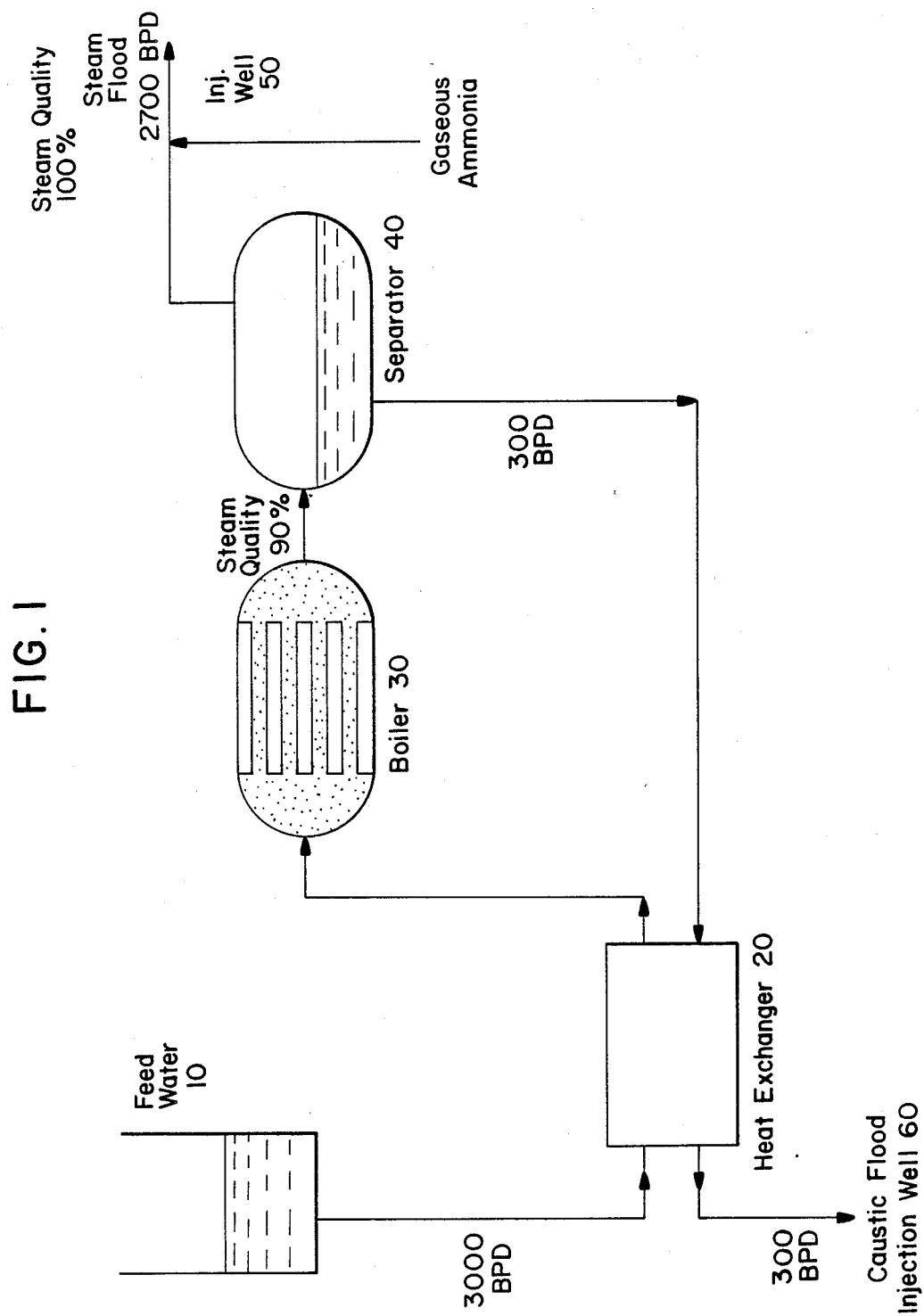
FIG. 1 is a schematic diagram of one embodiment of the present invention.

The problems of gravel pack and siliceous formation dissolution are a function of the pH of the steam generator feedwater and its bicarbonate concentration. For example, the decomposition of the bicarbonate ion upon heating is according to the formula:

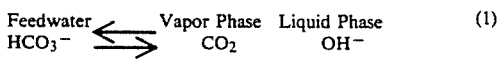

$$\text{Feedwater} \underset{HCO_3^-}{\rightleftarrows} \quad \underset{CO_2}{\text{Vapor Phase}} \quad \underset{OH^-}{\text{Liquid Phase}} \qquad (1)$$

This causes the pH of the vapor phase of the steam (upon condensation) to drop and the pH of the residual liquid phase to increase. During steam injection, the vapor phase of the steam typically enters the upper part of the production interval while the alkaline liquid residual fluid phase enters the lower part of the production interval. However, regardless of where the vapor or liquid phases of the steam enter the production interval, the pH partitioning causes gravel pack and formation rock dissolution and increases overall maintenance costs and time.

This problem is simply and effectively addressed by physically removing an amount of the liquid phase from the steam prior to injection effective to reduce silica dissolution in the vicinity of the liquid phase. Preferably, at least 40% is removed; more preferably, at least 70% is removed; and most preferably, substantially all of the liquid phase is removed from the wet steam. By removing most of the alkaline liquid phase, silica dissolution is greatly reduced.

Another problem associated with heating a bicarbonate-containing feedwater as shown by Equation (1), is the partitioning of $CO_2$ into the vapor phase of the wet steam. When the vapor phase is condensed, the $CO_2$ forms carbonic acid and may result in a vapor phase condensate having a pH in the 4.0 to 4.5 range. This problem is remedied by adding an amount of a chemical compound which forms an alkaline component in the vapor phase of the wet steam when heated effective to inhibit corrosion in the vicinity of the vapor phase. Useful alkaline component forming compounds include anhydrous ammonia, urea, ammonium bicarbonate, ammonium carbonate, ammonium sulfate, ammonium chloride, ammonium hydroxide, ammonium acetate, ammonium nitrate, and mixtures thereof.

In the present invention, a feedwater is heated in a steam generator to produce wet steam. Preferably, the wet steam has a steam quality of at least 80%, more preferably 90%. The maximum effective steam quality is, however, limited by the solubility of the feedwater salts. When steam is generated from the feedwater, all of the dissolved salts are concentrated in the residual liquid phase. Practically speaking, the highest useful steam quality is the maximum which will keep the feedwater salts dissolved in the residual liquid phase.

The high quality wet steam is then separated in a separator into a liquid phase and a vapor phase. Substantially all of the liquid phase is then removed.

In a preferred embodiment, anhydrous ammonia is added to the vapor phase of the steam prior to injecting it into the reservoir via the well. The ammonia addition should occur as soon as possible after the liquid phase is removed. The steam generator, separator, and ammonia injection should form a tight series. Alternatively, an ammonia-producing compound can be added to the steam generator feedwater or to the wet steam itself based on the bicarbonate concentration in the feedwater.

Also associated with injecting wet steam is the problem of permeability damage of hydrocarbon formations containing clay. Formations that contain clay minerals are susceptible to water-rock interactions that cause the clay to disperse and migrate. When they move downstream, they tend to bridge in pore constrictions to form miniature filter-cakes throughout the pore network. This can decrease steam injectivity in the lower interval where liquid water is injected and also in the upper interval where vapor phase condensation takes place. In some cases, clay structural expansion may contribute to this decrease in permeability.

Ammonia is highly effective for clay stabilization in the vapor phase condensation region. The previously listed ammonia-containing compounds are preferred for this purpose.

In an alternative embodiment of the present invention, an amount of ammonium ions is added to the wet steam to produce an ammonium ion concentration in the vapor phase condensate of the wet steam effective to inhibit permeability damage of clay mineral-containing hydrocarbon formations in the vicinity of the vapor phase of the injected wet steam and to improve the injectivity of the wet steam into the formation at the same location. Preferably, the ammonium ion concentration in the vapor phase condensate of the wet steam is less than 2N, more preferably, from 0.01N to 0.5N. Preferably, the source of ammonium is the previously listed ammonia-containing compounds. Anhydrous ammonia added directly to the wet steam is also very effective.

One problem with physically removing most of the liquid phase from the steam prior to injection is that the liquid phase contains a large amount of heat that would be wasted if not recovered. Thus, in one embodiment of the present invention, the heat is recovered from the separated liquid phase by preheating the feedwater through a heat exchanger. Another way of minimizing the amount of heat loss by physically removing most of the liquid phase from the steam prior to injection is to minimize the amount of liquid phase. This can be done by making the highest quality steam that will keep all of the salts dissolved in the liquid fraction.

Minimizing the amount of liquid phase of the steam by making high quality steam in the steam generator also helps reduce the problem of disposing of the liquid phase that is removed.

Referring to FIG. 1, in one embodiment of the present invention, feedwater from feedwater storage 10 is preheated in heat exchanger 20, then is heated in steam generator 30 to produce steam having a steam quality of 90%. That steam is immediately passed to separator 40, where it is separated into a liquid phase and a vapor phase, then the liquid phase of the steam is removed from the vapor phase of the steam. Anhydrous ammonia is added to the vapor phase of the steam, and both the vapor phase of the steam and gaseous ammonia are injected into the reservoir via steam flood injection well 50. Heat is recovered from the separated liquid phase by preheating the feedwater through heat exchanger 20.

In an alternative embodiment, the liquid phase can be contiuously adjusted to maintain the pH within the range of from about 8.0 to about 10.0, preferably 8.5 to 9.5, to avoid silica dissolution and pre-corrosion problems.

While the present invention has been described with reference to specific embodiments, this application is intended to cover those various changes and substitutions which may be made by those skilled in the art without departing from the spirit and scope of the appended claims.

What is claimed is:

1. A method for inhibiting silica dissolution in the vicinity of a well penetrating a hydrocarbon-containing formation, comprising:
   (a) adding an amount of a chemical compound to a wet steam which forms an alkaline component in the vapor phase of said wet steam effective to inhibit corrosion in the vicinity of the vapor phase condensate;
   (b) separating in a separation vessel said wet steam into a liquid phase and said vapor phase;
   (c) removing an amount of said liquid phase from said separation vessel effective to reduce silica dissolution in the vicinity of said liquid phase; and
   (d) injecting said wet steam into said formation.

2. A method, according to claim 1, wherein at least 40% of said liquid phase is removed.

3. A method, according to claim 2, wherein at least 70% of said liquid phase is removed.

4. A method, according to claim 1, wherein said wet steam has a steam quality of at least 80%.

5. A method, according to claim 4, wherein said wet steam has a steam quality of at least 90%.

6. A method, according to claim 1, wherein said wet steam has a steam quality wherein dissolved salts in said wet steam remain soluble in said liquid phase.

7. A method, according to claim 1, wherein said alkaline component forming compound comprises an ammonia-producing substance added to said vapor phase of said wet steam.

8. A method, according to claim 7, wherein said alkaline component forming compound comprises anhydrous ammonia added to said vapor phase of said wet steam.

9. A method for inhibiting silica dissolution and preventing permeability damage in a hydrocarbon formation containing clay minerals in the vicinity of a well penetrating said formation, comprising:
   (a) adding an amount of a chemical compound to a wet steam which forms ammonia gas in the vapor phase of said wet steam effective to inhibit permeability damage of said formation;

(b) separating an amount of said liquid phase from said wet steam effective to reduce silica dissolution in the vicinity of said liquid phase;

(c) removing an amount of the liquid phase from said wet steam effective to reduce silica dissolution in the vicinity of the liquid phase; and (d) injecting said wet steam into said formation.

10. A method, according to claim 9, wherein said ammonia gas forming chemical compound is selected from the group consisting of anhydrous ammonia, urea, ammonium bicarbonate, ammonium carbonate, ammonium hydroxide, and mixtures thereof.

11. A method, according to claim 9, wherein said ammonia gas producing chemical compound is added in an amount effective to produce a concentration of ammonium ions in the vapor phase condensate of less than 2N.

12. A method, according to claim 11, wherein said concentration of ammonium ions in said vapor phase condensate ranges from about 0.01N to about 0.5N.

13. A method for inhibiting silica dissolution and preventing permeability damage in a hydrocarbon formation containing clay minerals in the vicinity of a well penetrating said formation, comprising:

(a) heating a feedwater in a steam generator to produce wet steam having a steam quality of at least 90%;

(b) separating said wet steam in a separator to produce a liquid phase and a vapor phase;

(c) removing substantially all of said liquid phase from said wet steam;

(d) recovering heat from said separated liquid phase by preheating said feedwater in a heat exchanger;

(e) adding an amount of anhydrous ammonia to said vapor phase effective to produce an ammonium ion concentration in the vapor phase condensate of said wet steam ranging from about 0.01N to about 0.5N; and (f) injecting said vapor phase and said anhydrous ammonia into said formation via said well.

14. A method for inhibiting silica dissolution in the vicinity of a well penetrating a hydrocarbon-containing formation, comprising:

(a) adding to a boiler feedwater used to generate a wet steam a chemical compound which forms an alkaline component in the vapor phase of said wet steam effective to inhibit corrosion in the vicinity of the vapor phase condensate;

(b) separating in a separation vessel said wet steam into a liquid phase and said vapor phase;

(c) removing an amount of said liquid phase from said separation vessel effective to reduce silica dissolution in the vicinity of said liquid phase; and (d) injecting said wet steam into said formation.

15. A method, according to claim 14, wherein said ammonia-producing substance is selected from the group consisting of anhydrous ammonia, urea, ammonium bicarbonate, ammonium carbonate, ammonium sulfate, ammonium chloride, ammonium hydroxide, ammonium acetate, ammonium nitrate, and mixtures thereof.

16. A method, according to claim 15, wherein said ammonia-producing substance comprises urea.

* * * * *